United States Patent [19]

Hulderman

[11] 3,868,607

[45] Feb. 25, 1975

[54] DOUBLY ADJUSTABLE WAVEGUIDE PIN SWITCH

[75] Inventor: Garry N. Hulderman, Riverside, Calif.

[73] Assignee: General Dynamics Corporation, Pomona, Calif.

[22] Filed: Oct. 15, 1973

[21] Appl. No.: 406,437

[52] U.S. Cl. .................. 333/98 S, 333/7 D, 333/35
[51] Int. Cl. .............................................. H01p 1/10
[58] Field of Search .................. 333/7 D, 81 B, 98 S

[56] References Cited

UNITED STATES PATENTS

| | | | |
|---|---|---|---|
| 3,516,031 | 6/1970 | Commerford | 333/98 S |
| 3,559,117 | 1/1971 | Sugimoto | 333/98 S |
| 3,701,055 | 10/1972 | Stiles | 333/7 D |

*Primary Examiner*—Paul L. Gensler
*Attorney, Agent, or Firm*—Henry M. Bissell; Edward B. Johnson

[57] ABSTRACT

A waveguide casing has a transverse bore through its top and bottom broad walls. A diode is disposed between a diode holding chuck and a slideable collar disposed in the top wall bore. The slideable collar is urged toward the diode by one end of a compression spring whose other end bears against a fixed collar in the upper bore. The chuck is threadably disposed in a chuck holder which itself is threadably disposed in the bottom wall bore.

4 Claims, 2 Drawing Figures

PATENTED FEB 25 1975

3,868,607

DOUBLY ADJUSTABLE WAVEGUIDE PIN SWITCH

BACKGROUND OF THE INVENTION

1. Field of the Invention

This invention is concerned generally with millimeter wave devices, and is more particularly concerned with such devices of the type known as PIN diode switches.

2. Description of the Prior Art

The control of millimeter wave energy presents very special problems since the flow of this energy is usually directed by its propagation through waveguide plumbing. Control of the flow of this energy in waveguides has been effected by mechanical switching means and gas tube switches. Within recent years there has been developed a solid state switching device known as a PIN diode, the designation having reference to its Positive Intrinsic Negative semiconductor material configuration.

The PIN diode switch offers several advantages over a mechanical switch, namely: higher switching speed, lower power consumption, and smaller physical dimensions. Insofar as gas tube switches are concerned, it is known that they are too slow at millimeter wave frequencies and require much power to control them.

On the other hand, up to the present time, solid state switches of the PIN diode variety have suffered from undesirable drawbacks as the frequency of the millimeter wave frequency under control has increased through the K-band. That is, as the frequency is extended above 30 gHz, the adjustments required to minimize insertion loss become very critical. Furthermore, even small variations among the parameters of diodes from a single batch are enough to require individual tuning of PIN switches. Up to the time of the present invention, no PIN switch is known to be commercially available for use at frequencies above 30 gHz.

SUMMARY OF THE INVENTION

It is a general object of the invention to provide a millimeter wave device comprising solid state means for attenuating the flow of millimetric energy in a waveguide. It is a further general object to provide solid state attenuation means adapted to operation at frequencies of 30 gHz and above.

It is another object to provide a millimetric wave energy attenuator of the solid state type which extends transversely in a waveguide passageway and which entails a minimum of insertion loss when the semiconductor member of the solid state means is operated at its minimum or reverse bias, but which provides a maximum of attenuation of the radio frequency energy in the waveguide when the semiconductor member is operated with a forward bias. In connection with the immediately foregoing object, it is still another object to provide an attenuator having a post arrangement supporting a diode member and extending through one broad wall of a rectangular waveguide, in which the diode member appears as an open circuit and the post arrangement offers little attenuation to the wave energy with zero or reverse bias on the diode member, but in which the diode appears as a short circuit and the post arrangement becomes a series tuned L-C circuit which effectively short circuits the waveguide when the diode member is forwardly biased for maximum attenuation of the wave energy.

It is a particular object to provide a post arrangement having a chuck supporting a PIN diode on its distal inner end and with its other end threadably received within a chuck holder which is threadably received in a transverse bore in one broad wall of the waveguide, wherein the combination of the adjustable chuck and chuck holder serves to match the low impedance of the PIN diode to the high impedance of the waveguide.

It is yet another object to provide a millimetric wave attenuator having a semiconductor member subject on one side thereof to positionable adjustment means in a waveguide, the other side being mechanically and electrically coupled to collar means having a movable collar portion contacting the semiconductor member, the collar means thereby effecting with the case of the waveguide a radio frequency filter to prevent the flow of wave energy from the waveguide into a circuit providing bias to the semiconductor member. In connection with the immediately foregoing object it is still yet another object to provide collar means comprising a fixed collar portion cooperable with the movable collar portion through a compression spring which serves to urge the movable collar portion into good electrical contact with the semiconductor member, the fixed and movable portions serving as one-quarter wave length chokes which complete the radio frequency circuit with the waveguide case for filtering purposes.

It is a specific object of the invention to provide a PIN diode switch having a post arrangement of a chuck supporting the diode on one side and a chuck holder threadably receiving the chuck and threadably disposed through a broad wall of a rectangular waveguide, a collar arrangement being disposed on the other side of the diode with a slideably movable collar urged into good electrical contact with the diode by a compression spring disposed between a fixed collar and the movable collar. With an arrangement of this type it is possible to effect relatively easy adjustments to establish a one-quarter wave length distance between the top surface of the chuck holder and the bottom facing surface of the slideably movable collar and concurrently establish the penetration of the chuck holder into the waveguide to a depth where the inductive reactance of the chuck holder is equal in magnitude to the capacitive reactance of the diode package.

It is a particular object to provide a PIN diode switch arrangement of relatively simple mechanical construction, albeit which enables a high degree of precise adjustment of the diode in the waveguide by relatively unskilled persons.

Other and further objects of the invention will be apparent to those skilled in the art upon consideration of the drawing and the specification hereinafter disclosing a preferred embodiment. It will be further recognized that the illustration and description of the preferred embodiment are in no way a limitation, and that other structures not so described and shown may be the equivalent of those disclosed and subject to the annexed claims.

DESCRIPTION OF THE PREFERRED EMBODIMENT

Figure 1:
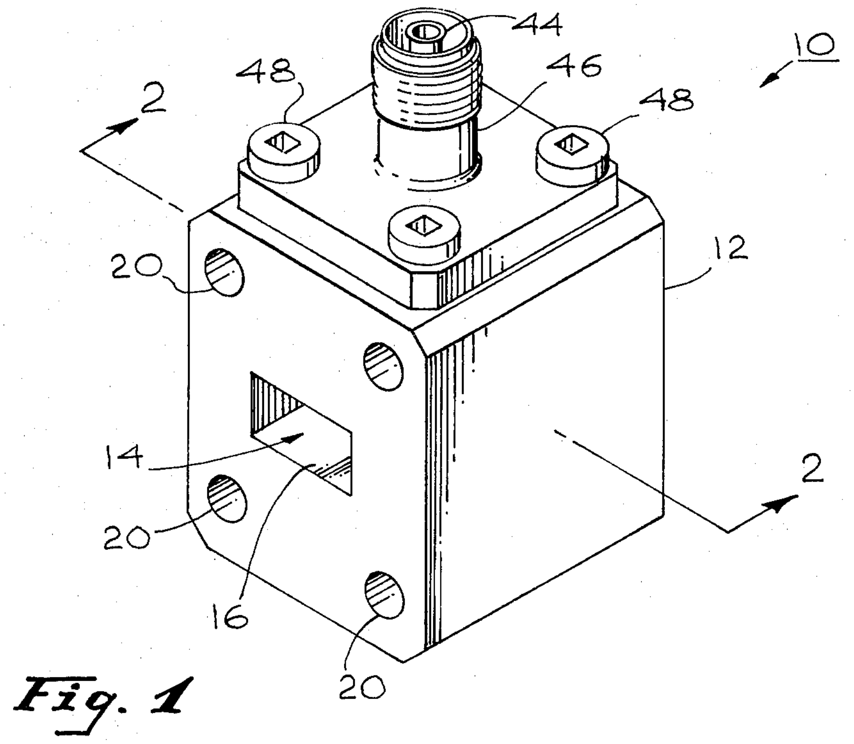
FIG. 1 is a perspective view of an embodiment of the invention.
Figure 2:
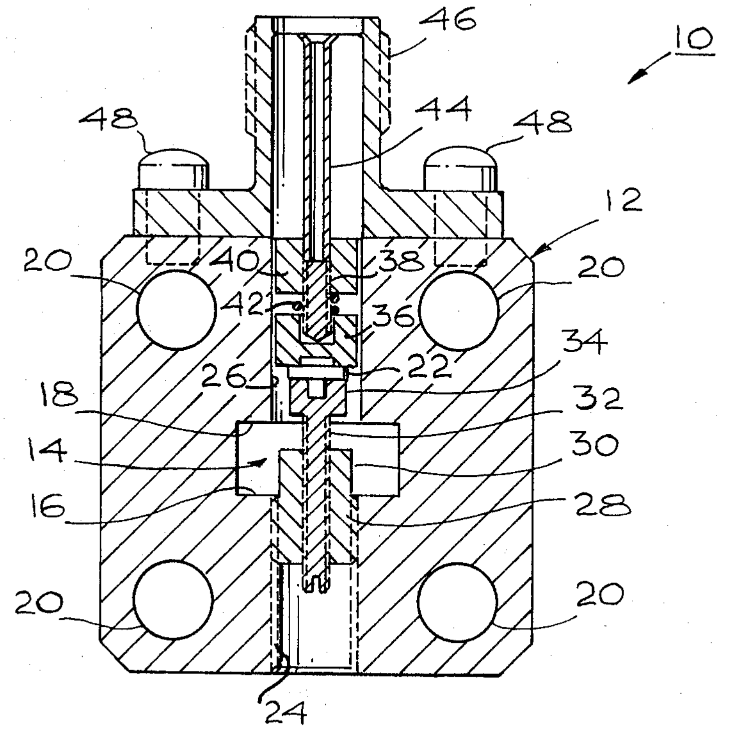
FIG. 2 is a cross-section view in elevation, taken on the plane 2—2 of FIG. 1.

Referring to the drawing there is depicted a millimeter wave device 10 having a block body or case 12 defining a conductive waveguide passageway 14 of rectangular configuration with a bottom broad wall 16 and a top broad wall 18 (FIG. 2). The case 12 is provided with a set of four conventionally disposed bore holes 20 for the insertion of the device 10 between the flanges of two waveguide sections or components (not shown), all as will be apparent to those skilled in the art.

As envisioned in this concept, the device 10 incorporates attenuation means for controlling the flow of millimeter wave energy through the waveguide passageway 14, and more particularly a PIN diode switch comprised of a semiconductor diode element 22 disposed in communication with said passageway between positioning and contacting means to be described in more detail hereinafter.

The body case 12 is provided with a threaded bore 24 intersecting the bottom wall 16, and a bore 26 intersecting the top wall 18. The axes of the bores 24 and 26 are common and normal to the central axis of the waveguide passageway 14. The lower bore 24 is threaded to receive a first adjusting member 28, hereinafter referred to as a chuck holder, having an end post portion 30 extending into the waveguide passageway 14. Threadably disposed in the first adjusting member 28 on the axis thereof is a second adjusting member 32, hereinafter referred to as a chuck, having a distal enlarged head end 34 to which is secured the lower electrode contact of the diode element 22, the positioning thereof being thereby accomplished at least in part by movement of the member 32 along its axis.

From the description thus far it is evident that the penetration of the post portion 30 of the member 28 into the waveguide passageway 14 is readily accomplished by rotation of the member 28 about its axis. Furthermore, the positioning adjustment of the diode 22 is easily done by rotation of the second member 32 in the first member 28. Since these adjustments are very critical for millimetric wave energy at 20 gHz, it is preferred that the threads be very fine, of the order of 64 to 80 threads per inch, for example; the threads on the chuck member 32, and on and in the holder member 28, and in the bore 24, are preferably accomplished by precision methods with close tolerances. It is seen that if the threads on two members 28 and 32 are of the same count, the holder member 28 may be advanced into the passageway 14 without axial movement of the diode 22 if the chuck member 32 is held against turning when the holder member 28 is rotated. Likewise, the chuck member 32 is independently adjustable when the holder member 28 is held against rotation.

The upper electrode contact of the diode 22 is contacted by a contacting arrangement including a collar 36 slideably movable on a pin 38 secured in a fixed collar 40. A small compression spring 42 is disposed between the collars 36 and 40 to urge the slideably movable collar 36 into good electrical contact with the diode 22. The fixed collar 40 is mounted on a hollow connector stud 44 which forms a conductor means coaxially disposed in a known type of commercially available connector 46, adapted to provide bias to the diode 22. The connector 46 is secured to the top wall of the diode 10 by screws 48. As is known, the stud 44 is insulated from the body of the connector 46. Likewise, the collars 36 and 40 are formed slightly smaller than the bore 26 whereby to insulate from ground the bias electrical path which extends from the stud 44 to the top of the diode 22 through the collar 40, the pin 38 and spring 42, and the collar 36.

With the contacting arrangement as aforesaid, the combination of the slideably movable and fixed collars or filter elements 36 and 40 with the case 12 provides a radio frequency filter choke to prevent the millimetric wave energy from flowing into the bias circuit through the connector stud 44, the tuning of the choke to a one-quarter wave length resonance frequency being accomplished by the axial adjustment of the movable collar 36 by means of the axial movement of the second adjusting chuck member 32. Since a wave of 30 gHz has a wave-length of the order of 10 millimeters, it is apparent that tuning of the collars to a one-quarter wave length in the neighborhood of 2.5 millimeters is indeed very critical, and that the arrangement described provides adjustment means to accomplish the required tuning in a minimum time by relatively unskilled persons having bare rudimentary training and skill for the purpose.

Although there has been described above one specific arrangement of a millimeter wave PIN switch in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A millimeter wave device comprising:

a. case means defining a waveguide passageway;

b. semiconductor positioning means disposed in said case means and adjustable relative thereto along an axis substantially normal to said passageway;

c. semiconductor contacting means in said case means and disposed substantially opposite said positioning means, said contacting means having a fixed pin portion and a movable collar portion movable on said pin portion along said axis of said positioning means at a predetermined distance from the semiconductor positioning means in cooperation therewith;

the positioning means comprising outer and inner concentric post members providing respectively a first adjustment for varying the penetration of the outer post member into the waveguide passageway and a second adjustment for establishing a predetermined distance between one end of the outer post member and the movable collar portion of the contacting means;

d. semiconductor means disposed between said positioning means and said movable collar portion of said contacting means, and communicating with said waveguide passageway; and c. bias circuit connector means coupled to said movable collar portion of said contacting means, said connector means and positioning means being adapted for coupling to a bias circuit for supplying bias energy to said semiconductor means, said contacting means effecting with said case means a filter for blocking radio frequency energy from said bias circuit.

2. The device of claim 1 in which said contacting means comprises:

a. a fixed collar portion supporting said fixed pin portion and secured relative to but insulated from said case means; and b. resilient force bias means disposed between said fixed and movable collar portions for urging said movable collar portion into good electrical contact with said semiconductor means, said fixed and movable collar portions serving as one-quarter wavelength chokes which complete the radio frequency circuit through said case means for filtering purposes.

3. The device of claim 1 in which the semiconductor means comprises a switching diode, the outer post member is threadably mounted in the case means, and the inner post member is threadably mounted within the outer post member.

4. A millimeter wave device comprising:

a. case means defining a waveguide passageway;

b. semiconductor positioning means disposed in said case means and adjustable relative thereto along an axis substantially normal to said passageway;

c. semiconductor contacting means in said case means and disposed substantially opposite said positioning means;

said contacting means having a fixed collar portion supporting a fixed pin portion and secured relative to but insulated from said case means, a movable collar portion movable on said pin portion along said axis of said positioning means at a predetermined distance from the semiconductor positioning means in cooperation therewith, and resilient force bias means disposed between said fixed and movable collar portions for urging said movable collar portion into good electrical contact with said semiconductor means, said fixed and movable collar portions serving as one-quarter wavelength chokes which complete the radio frequency circuit through said case means for filtering purposes and effecting with said case means a filter for blocking radio frequency energy from said bias circuit;

d. semiconductor means disposed between said positioning means and said movable collar portion of said contacting means, and communicating with said waveguide passageway; and e. bias circuit connector means coupled to said movable collar portion of said contacting means, said connector means and positioning means being adapted for coupling to a bias circuit for supplying bias energy to said semiconductor means.

* * * * *